(12) United States Patent
Henry et al.

(10) Patent No.: US 11,954,770 B2
(45) Date of Patent: Apr. 9, 2024

(54) SYSTEM AND METHOD FOR RECREATING GRAPHICAL IMAGE USING CHARACTER RECOGNITION TO REDUCE STORAGE SPACE

(71) Applicant: Rockwell Collins, Inc., Cedar Rapids, IA (US)

(72) Inventors: Jeff M. Henry, Cedar Rapids, IA (US); Reed A. Kovach, Cedar Rapids, IA (US); Todd E. Miller, Marion, IA (US); Jason L. Wong, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 217 days.

(21) Appl. No.: 17/525,534

(22) Filed: Nov. 12, 2021

(65) Prior Publication Data
US 2023/0154072 A1    May 18, 2023

Related U.S. Application Data

(60) Provisional application No. 63/278,576, filed on Nov. 12, 2021.

(51) Int. Cl.
*G06T 11/20* (2006.01)

(52) U.S. Cl.
CPC ................................. *G06T 11/203* (2013.01)

(58) Field of Classification Search
None
See application file for complete search history.

(56) References Cited

U.S. PATENT DOCUMENTS

| | | |
|---|---|---|
| 3,522,586 A | 8/1970 | Kiji et al. |
| 3,656,178 A | 4/1972 | Maine et al. |
| 4,096,527 A | 6/1978 | Furuta |
| 4,736,303 A | 4/1988 | Itoh et al. |
| 4,792,981 A | 12/1988 | Cahill, III et al. |
| 4,876,651 A | 10/1989 | Dawson et al. |
| 5,050,230 A | 9/1991 | Jones et al. |

(Continued)

FOREIGN PATENT DOCUMENTS

| | | |
|---|---|---|
| CA | 3095088 C | 2/2021 |
| CN | 1045835 C | 10/1999 |

(Continued)

OTHER PUBLICATIONS

Extended European Search Report dated Apr. 21, 2023; European Application No. 22207060.9.

(Continued)

*Primary Examiner* — Jeffrey J Chow
(74) *Attorney, Agent, or Firm* — Suiter Swantz pc llo

(57) ABSTRACT

A system may include a computer readable medium and a processor communicatively coupled to the computer readable medium. The processor may be configured to: obtain a graphical image file, the graphical image file including an image, wherein the image includes a portion including textual characters, wherein each textual character of the textual characters is formed of line segments; and convert the graphical image file to at least one file including hardware directives that when executed cause a recreation of the image of the graphical image file to be drawn, wherein a size of the at least one file is smaller than the graphical image file.

12 Claims, 10 Drawing Sheets

(56) References Cited

U.S. PATENT DOCUMENTS

| | | |
|---|---|---|
| 5,428,692 A | 6/1995 | Kuehl |
| 5,454,076 A | 9/1995 | Cain et al. |
| 5,499,382 A | 3/1996 | Nusinov et al. |
| 5,537,669 A | 7/1996 | Evans et al. |
| 5,546,572 A | 8/1996 | Seto et al. |
| 5,559,707 A | 9/1996 | DeLorme et al. |
| 5,577,170 A | 11/1996 | Karow |
| 5,936,637 A | 8/1999 | Seto |
| 5,978,715 A | 11/1999 | Briffe et al. |
| 6,014,133 A | 1/2000 | Yamakado et al. |
| 6,240,341 B1 | 5/2001 | Snyder |
| 6,275,610 B1 | 8/2001 | Hall, Jr. et al. |
| 6,320,984 B1 | 11/2001 | Shigeta |
| 6,448,922 B1 | 9/2002 | Kelly |
| 6,501,441 B1 | 12/2002 | Ludtke et al. |
| 6,839,714 B2 | 1/2005 | Wheeler et al. |
| 7,039,505 B1 | 5/2006 | Southard et al. |
| 7,096,211 B2 | 8/2006 | Fujihara |
| 7,173,738 B2 | 2/2007 | Kohn |
| 7,552,010 B2 | 6/2009 | Saito |
| 7,552,011 B2 | 6/2009 | Ishii et al. |
| 7,562,289 B2 | 7/2009 | Bufkin et al. |
| 7,581,036 B2 | 8/2009 | Powell et al. |
| 7,609,263 B2 | 10/2009 | Nagasaki et al. |
| 7,739,622 B2 | 6/2010 | DeLine et al. |
| 7,777,749 B2 | 8/2010 | Chung et al. |
| 7,948,502 B2 | 5/2011 | Stanton |
| 7,966,609 B2 | 6/2011 | Serebryany |
| 8,035,642 B2 | 10/2011 | Suzuki |
| 8,165,732 B2 | 4/2012 | Corbefin et al. |
| 8,169,505 B2 | 5/2012 | Hoshi |
| 8,306,745 B1 | 11/2012 | Clark et al. |
| 8,339,417 B2 | 12/2012 | Stroila et al. |
| 8,374,390 B2 | 2/2013 | Stroila et al. |
| 8,379,065 B2 | 2/2013 | Nam et al. |
| 8,515,658 B1* | 8/2013 | Foster ............... G01C 23/005 701/410 |
| 8,583,368 B1 | 11/2013 | Sindlinger et al. |
| 8,704,732 B2 | 4/2014 | Pourbigharaz et al. |
| 8,937,737 B2 | 1/2015 | Tsutsumi et al. |
| 9,035,969 B2 | 5/2015 | Ivashin et al. |
| 9,195,637 B2 | 11/2015 | Peraza et al. |
| 9,430,195 B1 | 8/2016 | Pecoraro et al. |
| 9,443,433 B1 | 9/2016 | Conway et al. |
| 9,465,513 B2 | 10/2016 | Sims |
| 9,489,121 B2 | 11/2016 | Davis et al. |
| 9,547,727 B2 | 1/2017 | Passani et al. |
| 9,619,919 B1 | 4/2017 | Postnikov et al. |
| 9,639,309 B1 | 5/2017 | Pugh |
| 9,671,935 B2 | 6/2017 | Miichi et al. |
| 9,703,455 B2 | 7/2017 | Cocco et al. |
| 9,781,294 B1 | 10/2017 | Chapman |
| 9,818,051 B2 | 11/2017 | Panek et al. |
| 9,858,823 B1 | 1/2018 | Lynn et al. |
| 9,891,875 B2 | 2/2018 | Kim et al. |
| 9,921,721 B2 | 3/2018 | Beavers et al. |
| 9,939,271 B1 | 4/2018 | Foster et al. |
| 10,001,376 B1 | 6/2018 | Tiana et al. |
| 10,061,480 B1 | 8/2018 | McCusker et al. |
| 10,170,010 B1 | 1/2019 | McCusker et al. |
| 10,372,292 B2 | 8/2019 | Vogel et al. |
| 10,674,075 B2 | 6/2020 | Kimura |
| 10,684,769 B2 | 6/2020 | Yamat et al. |
| 10,872,274 B2 | 12/2020 | Mao et al. |
| 10,880,522 B2 | 12/2020 | McCutchen et al. |
| 10,984,501 B2 | 4/2021 | Milan et al. |
| 11,030,477 B2 | 6/2021 | Becker et al. |
| 11,061,563 B1 | 7/2021 | Nielsen et al. |
| 11,106,329 B2 | 8/2021 | He et al. |
| 2003/0151630 A1 | 8/2003 | Kellman et al. |
| 2004/0071351 A1 | 4/2004 | Rade |
| 2004/0225440 A1 | 11/2004 | Khatwa et al. |
| 2005/0030321 A1 | 2/2005 | Anwar |
| 2005/0091340 A1 | 4/2005 | Facemire et al. |
| 2006/0031006 A1 | 2/2006 | Stenbock et al. |
| 2006/0215915 A1 | 9/2006 | Kim |
| 2007/0067095 A1 | 3/2007 | King |
| 2007/0094591 A1 | 4/2007 | Etgen et al. |
| 2007/0112517 A1 | 5/2007 | Goldstein |
| 2007/0185651 A1 | 8/2007 | Motoyama et al. |
| 2008/0046254 A1 | 2/2008 | Nuno et al. |
| 2008/0103641 A1 | 5/2008 | Ratcliffe |
| 2008/0240152 A1 | 10/2008 | Quinn et al. |
| 2009/0080801 A1 | 3/2009 | Hatfield et al. |
| 2009/0123070 A1 | 5/2009 | Xiaoying |
| 2009/0125837 A1 | 5/2009 | Hatem et al. |
| 2009/0324065 A1* | 12/2009 | Ishida ................. G06T 7/11 382/164 |
| 2010/0128020 A1 | 5/2010 | Oh et al. |
| 2010/0218089 A1 | 8/2010 | Chao et al. |
| 2010/0262318 A1 | 10/2010 | Ariens |
| 2010/0328353 A1* | 12/2010 | McDonald ......... G06F 3/04845 345/671 |
| 2011/0191014 A1 | 8/2011 | Feng et al. |
| 2012/0019673 A1 | 1/2012 | Narayanan |
| 2012/0242687 A1 | 9/2012 | Choi |
| 2012/0287151 A1 | 11/2012 | James et al. |
| 2014/0168277 A1 | 6/2014 | Ashley et al. |
| 2014/0225928 A1 | 8/2014 | Konnola et al. |
| 2014/0282038 A1 | 9/2014 | Royster et al. |
| 2015/0070373 A1 | 3/2015 | Clinton |
| 2015/0239574 A1 | 8/2015 | Ball et al. |
| 2015/0278626 A1 | 10/2015 | Nakamura |
| 2015/0324088 A1 | 11/2015 | Pasetto et al. |
| 2016/0092557 A1 | 3/2016 | Stojanovic et al. |
| 2017/0262413 A1* | 9/2017 | Song ................. G06F 16/332 |
| 2017/0299633 A1 | 10/2017 | Pietrowicz et al. |
| 2017/0313332 A1 | 11/2017 | Paget et al. |
| 2018/0181646 A1 | 6/2018 | Balasa et al. |
| 2018/0253889 A1 | 9/2018 | Nagasaka |
| 2019/0057671 A1 | 2/2019 | Baer et al. |
| 2019/0220234 A1 | 7/2019 | Lewis et al. |
| 2019/0237043 A1* | 8/2019 | Tahmasebi ............. G09G 5/026 |
| 2019/0299701 A1 | 10/2019 | Bartels |
| 2020/0089694 A1 | 3/2020 | Cabra et al. |
| 2020/0195924 A1 | 6/2020 | Hsiang |
| 2020/0251029 A1 | 8/2020 | Tseng |
| 2020/0255350 A1 | 8/2020 | Baek |
| 2020/0320142 A1 | 10/2020 | Malak et al. |
| 2020/0386567 A1 | 12/2020 | Igarashi |
| 2021/0004930 A1 | 1/2021 | Kamath et al. |
| 2021/0035453 A1 | 2/2021 | Khan et al. |
| 2021/0056300 A1 | 2/2021 | Chitta et al. |
| 2021/0192202 A1 | 6/2021 | Tripuraneni et al. |
| 2021/0225181 A1 | 7/2021 | Feyereisen et al. |
| 2021/0349615 A1 | 11/2021 | Ruby et al. |
| 2023/0154338 A1 | 5/2023 | Henry et al. |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |
| EP | 1687777 A2 | 8/2006 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |

(56) References Cited

FOREIGN PATENT DOCUMENTS

| | | |
|---|---|---|
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 2009282855 A | 12/2009 |
| JP | 4728744 B2 | 7/2011 |
| WO | 9523364 A2 | 8/1995 |
| WO | 1998043208 A3 | 1/1999 |
| WO | 2011036499 A1 | 3/2011 |
| WO | 2014146561 A1 | 9/2014 |
| WO | 2021035223 A1 | 2/2021 |
| WO | 2021035954 A1 | 3/2021 |

OTHER PUBLICATIONS

Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Extended European Search Report dated Mar. 24, 2023; European Application No. 22207029.4.
Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.
Extended European Search Report dated Apr. 11, 2023; European Application No. 22207049.2.
Extended European Search Report dated Apr. 4, 2023; European Application No. 22207012.0.
Extended European Search Report dated Apr. 5, 2023; European Application No. 22207019.5.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusuion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitude Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. Vol. 2, pp. 13_D_1_1_13_D_1_9, XP010669024.
ArcGIS, "Introduction to export a map or layout", retrieved from the Internet Nov. 11, 2021.
Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.
Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet , Nov. 11, 2021, 11 pages.
Pamental, Jason, "The evolution of typography with variable fonts", Retrieved from the Internet , Nov. 11, 2021.
Penquerch, "[AD] RLE clipping speedup patch" (2002), Retrieved from Internet , Nov. 11, 2021.
QGIS: Open-source cross-platform GIS software, Retrieved from Internet , Nov. 11, 2021.
Somasundaram, K. "A Method for Filling Holes in Objects of Medical Images Using Region Labeling and Run Length Encoding Schemes." (2010).
Anonymous: "Pilot's Guide to ForeFlight Mobile 82nd Edition Covers ForeFlight Mobile v12.7", Aug. 26, 2020, pp. 161-165.
Anonymous: Pilot's Guide to ForeFlight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023, European Application No. 22207047.6.
Extended European Search Report dated Apr. 5, 2023; European Application No. 22207057.5.
Seo et al., "Fast Contour-Tracing Algorithm Based on a Pixel-Following Method for Image Sensors", Sensors, MPDI (Year: 2016).

\* cited by examiner

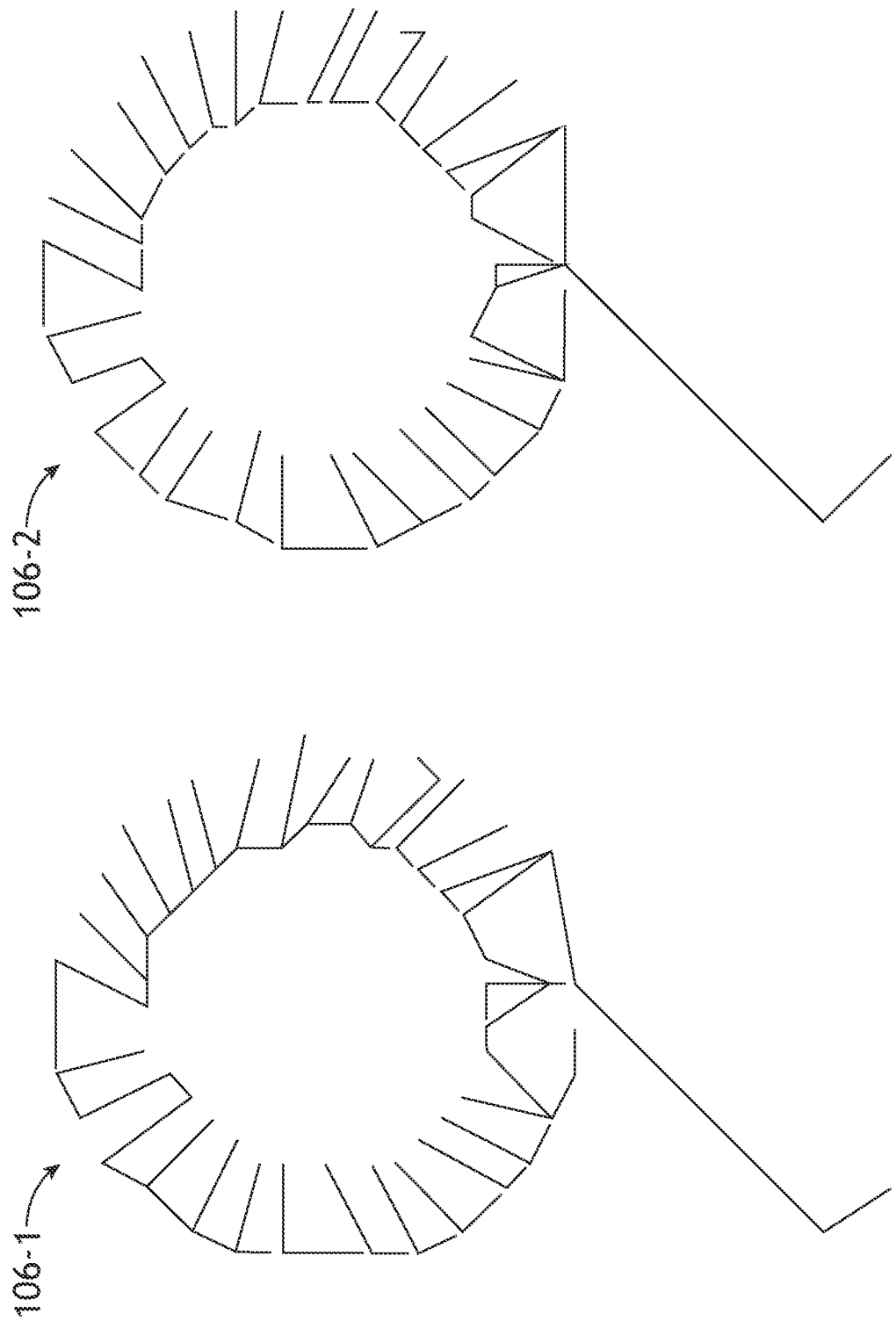

| Char | Width/ Height Ratio | Path Angle Ranges (deg) |
|---|---|---|
| A | 0.89-0.92 | 1[Range:293-296, Range:244-247, Range:113-115, Range:244-246, Range:293-296], 2[ Range:64-66, Range:64-66] |
| C | 0.79-0.81 | 1[Range:294-297, Curve:176-181, Range:298-301, Range:241-244, Curve:179-183] |

FIG. 6A

| Front Table Index | Char | Width (pts) | Height (pts) | Ref Angle (deg) | Ref Angle Pt 1 | Ref Angle Pt 2 |
|---|---|---|---|---|---|---|
| 65 | A | 4.09375 | 4.515625 | 0.0 | First | First+1 |
| 67 | C | 3.71875 | 4.640625 | -179.6298705262388 | Last-1 | Last |

FIG. 6B

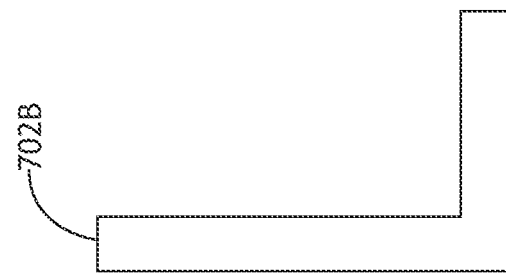
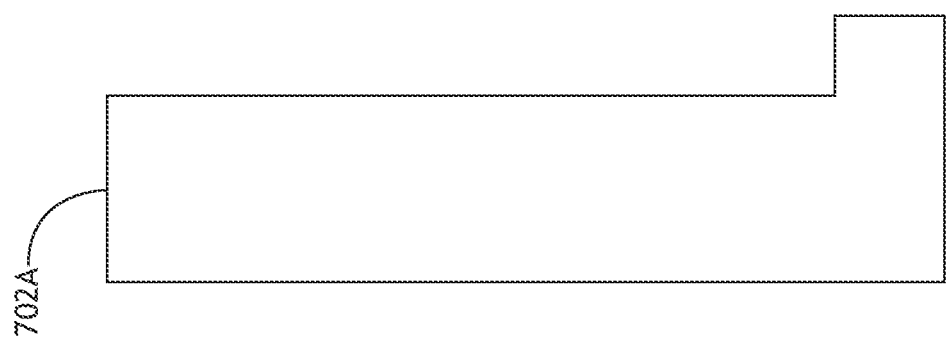
FIG. 7

800

802 — OBTAINING, BY AT LEAST ONE PROCESSOR COMMUNICATIVELY COUPLED TO AT LEAST ONE COMPUTER READABLE MEDIUM, A GRAPHICAL IMAGE FILE, THE GRAPHICAL IMAGE FILE INCLUDING AN IMAGE, WHEREIN THE IMAGE INCLUDES AT LEAST ONE PORTION INCLUDING TEXTUAL CHARACTERS, WHEREIN EACH TEXTUAL CHARACTER OF THE TEXTUAL CHARACTERS IS FORMED OF LINE SEGMENTS

804 — CONVERTING, BY THE AT LEAST ONE PROCESSOR, THE GRAPHICAL IMAGE FILE TO AT LEAST ONE FILE INCLUDING HARDWARE DIRECTIVES THAT WHEN EXECUTED CAUSE A RECREATION OF THE IMAGE OF THE GRAPHICAL IMAGE FILE TO BE DRAWN, WHEREIN A SIZE OF THE AT LEAST ONE FILE IS SMALLER THAN THE GRAPHICAL IMAGE FILE

FIG.8

SYSTEM AND METHOD FOR RECREATING GRAPHICAL IMAGE USING CHARACTER RECOGNITION TO REDUCE STORAGE SPACE

CROSS-REFERENCE TO RELATED APPLICATIONS

The present application is related to and claims priority from: U.S. Application Ser. No. 63/278,576, filed Nov. 17, 2021. U.S. Application Ser. No. 63/278,576 is herein incorporated by reference in its entirety.

BACKGROUND

Flight charts are typically received from a third-party vendor in an industry standard print format, such as a portable digital file (PDF) format which are large in file size. The space required to store flight charts in an avionics system is large, and the available space to store flight charts in those avionics systems is limited. Additionally, avionics systems typically must maintain a multitude of potentially needed flight charts for each flight, which compounds the storage capacity problem. Currently, each character on a PDF version of a flight chart is represented as a rasterized image character, and the text formed from such rasterized image characters requires considerable space to maintain, especially when multiple flight charts typically should be maintained by an avionics display unit computing device.

SUMMARY

In one aspect, embodiments of the inventive concepts disclosed herein are directed to a system. The system may include at least one computer readable medium and at least one processor communicatively coupled to the at least one computer readable medium. The at least one processor may be configured to: obtain a graphical image file, the graphical image file including an image, wherein the image includes at least one portion including textual characters, wherein each textual character of the textual characters is formed of line segments; and convert the graphical image file to at least one file including hardware directives that when executed cause a recreation of the image of the graphical image file to be drawn, wherein a size of the at least one file is smaller than the graphical image file.

In a further aspect, embodiments of the inventive concepts disclosed herein are directed to a method. The method may include: obtaining, by at least one processor communicatively coupled to at least one computer readable medium, a graphical image file, the graphical image file including an image, wherein the image includes at least one portion including textual characters, wherein each textual character of the textual characters is formed of line segments; and converting, by the at least one processor, the graphical image file to at least one file including hardware directives that when executed cause a recreation of the image of the graphical image file to be drawn, wherein a size of the at least one file is smaller than the graphical image file.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a view of an exemplary embodiment of two exemplary unclosed sets of paths according to the inventive concepts disclosed herein.

FIGS. 6A and 6B are views of exemplary embodiments of data structures containing predetermined font characteristic values for predetermined characters of a given font according to the inventive concepts disclosed herein.

FIG. 7 is a view of an exemplary embodiment comparing a building and an "L" textual character according to the inventive concepts disclosed herein.

FIG. 8 is a diagram of an exemplary embodiment of a method according to the inventive concepts disclosed herein.

DETAILED DESCRIPTION

Figure 1:
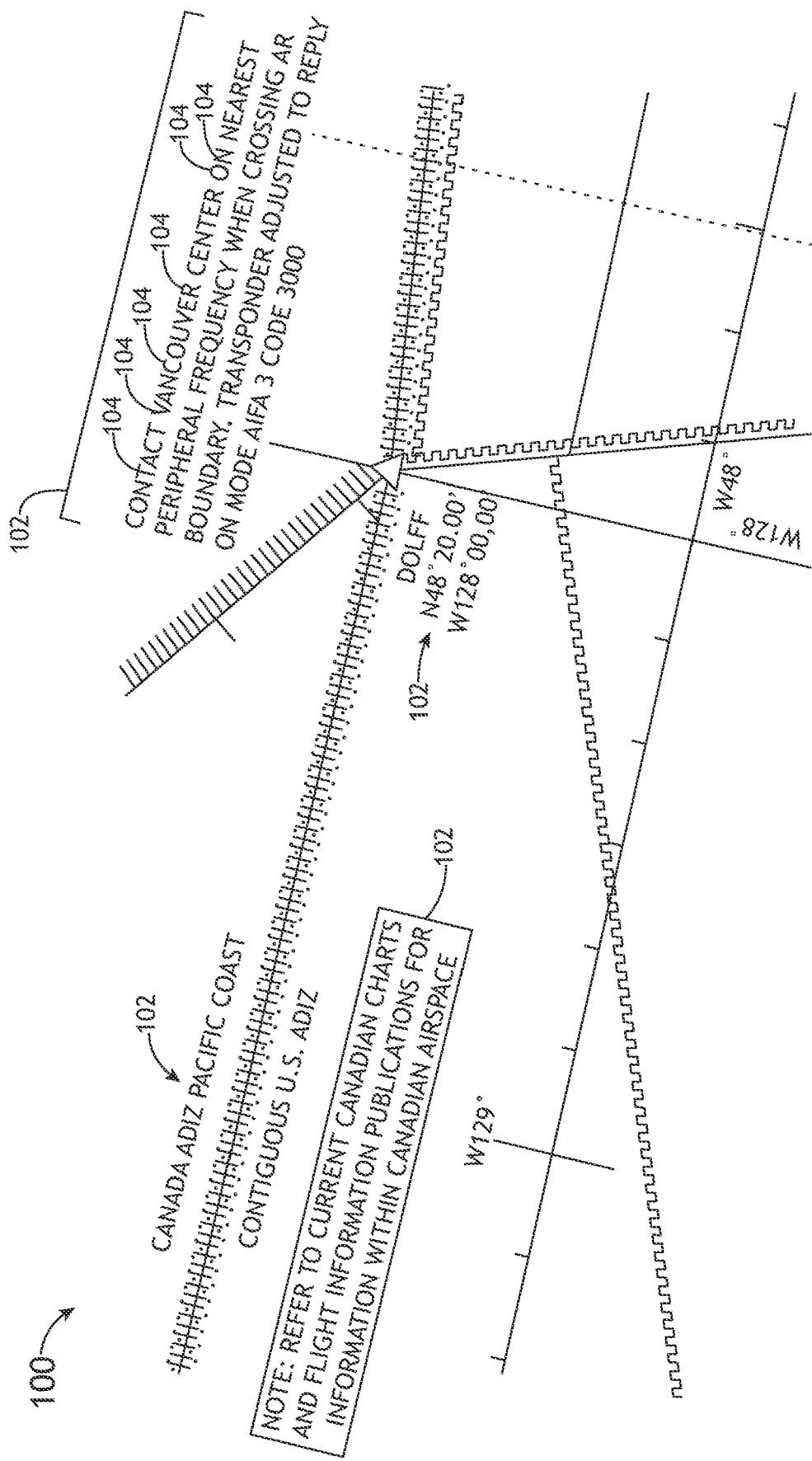
FIG. 1 is a view of an exemplary embodiment of an image of an image file according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to recreate an image of a graphical image file to reduce storage space, the image having textual characters.

Some embodiments include a method for automated character recognition within a tool set of a host computing device that may generate charts for use within an avionics application (e.g., of an avionics display unit computing device). While some embodiments are related to a tool to facilitate customer generated chart databases for use with a certified avionics system, other embodiments may use the method for character recognition in any system that needs to recognize characters as alpha-numeric entities and not as groups of lines.

Some embodiments may include converting avionics charts (e.g., flight charts) from a PDF format into a set of graphical hardware directives for an avionics display unit to display. Characters in the PDF format are often defined by individual lines and are often rasterized. Some embodiments may convert characters of the PDF into characters (e.g., vectorized characters) which are stored once, but used many times, which can reduce the space required for character storage by up to 99% or more.

Currently, the flight charts are large enough that the charts will not fit within the hardware constraints imposed by an avionics display system. This may be true both for the size of one displayed chart and for the total size of all stored charts. Reducing the space used for characters may improve the ability to provide avionics charts to pilots.

Figure 2:
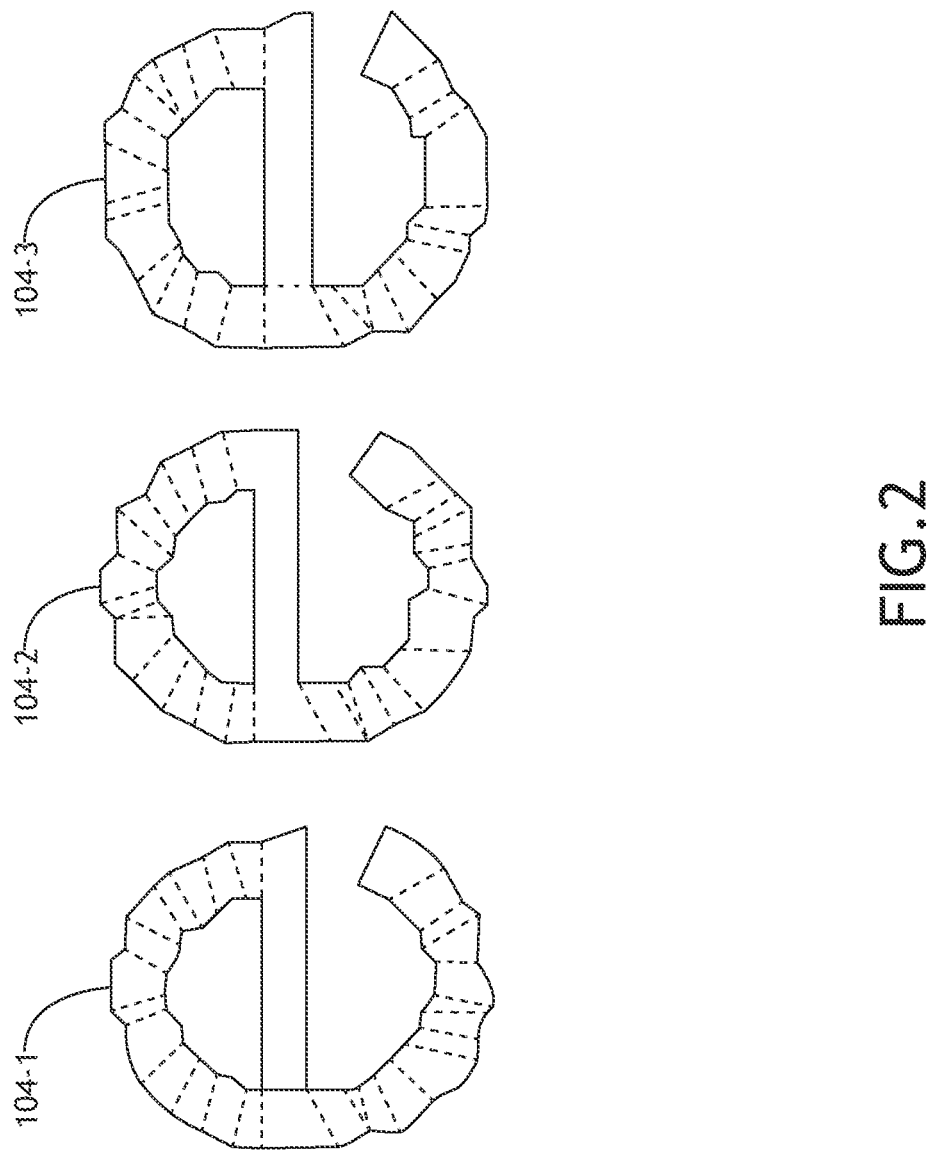
FIG. 2 is a view of an exemplary embodiment of three textual characters according to the inventive concepts disclosed herein.

In some embodiments, PDF input characters, such as shown in FIGS. 2 and 4, do not follow a specific standard. This makes detecting a character difficult, and accuracy of character recognition is important for presenting accurate information to a pilot. The mechanism to detect characters should be flexible enough to find characters that are defined differently from each other, but should also not find groups of lines that are not characters.

In some embodiments, clarity can be improved using standard characters. It is important that the pilot be able to read the displayed charts in the cockpit. Since a single standard is not followed, and because PDF characters vary in their clarity, using a common font can improve cockpit readability by a pilot.

Some embodiments may provide a system and method to condense certain types of repeating textual characters in a display system (e.g., an avionics display system) without affecting the image displayed. While some embodiments may be used by an avionics display system, other embodiments may be used in any suitable system that handles images having repeating textual characters that could be condensed to reduce storage space.

Referring now to FIG. 1, an exemplary embodiment of an image (e.g., a flight chart image 100) of an image file (e.g., a graphical image file) according to the inventive concepts disclosed herein is depicted. For example, flight charts typically have many textual portions 102 including textual characters 104 in various locations of the flight chart image 100.

Referring now to FIG. 2, an exemplary embodiment of three textual characters 104-1, 104-2, 104-3 of the image (e.g., the flight chart image 100) of the image file (e.g., a graphical image file) according to the inventive concepts disclosed herein is depicted. For example, each of the three textual characters 104-1, 104-2, 104-3 (e.g., "e" textual characters) may be defined by individual lines and may be rasterized; however, each of the three textual characters 104-1, 104-2, 104-3 may be defined differently by the individual lines making up a given textual character 104.

In some embodiments for character recognition, the tolerances should be set so that characters are detected with a high probability and nearly never (or never) incorrectly. Tolerances may be used since the group of lines representing a character is not always 'clean'. Adding tolerances allows detection of characters 104-1, 104-2, 104-3 (different "e"s) with these types of imperfection and inconsistency.

Figure 3A:
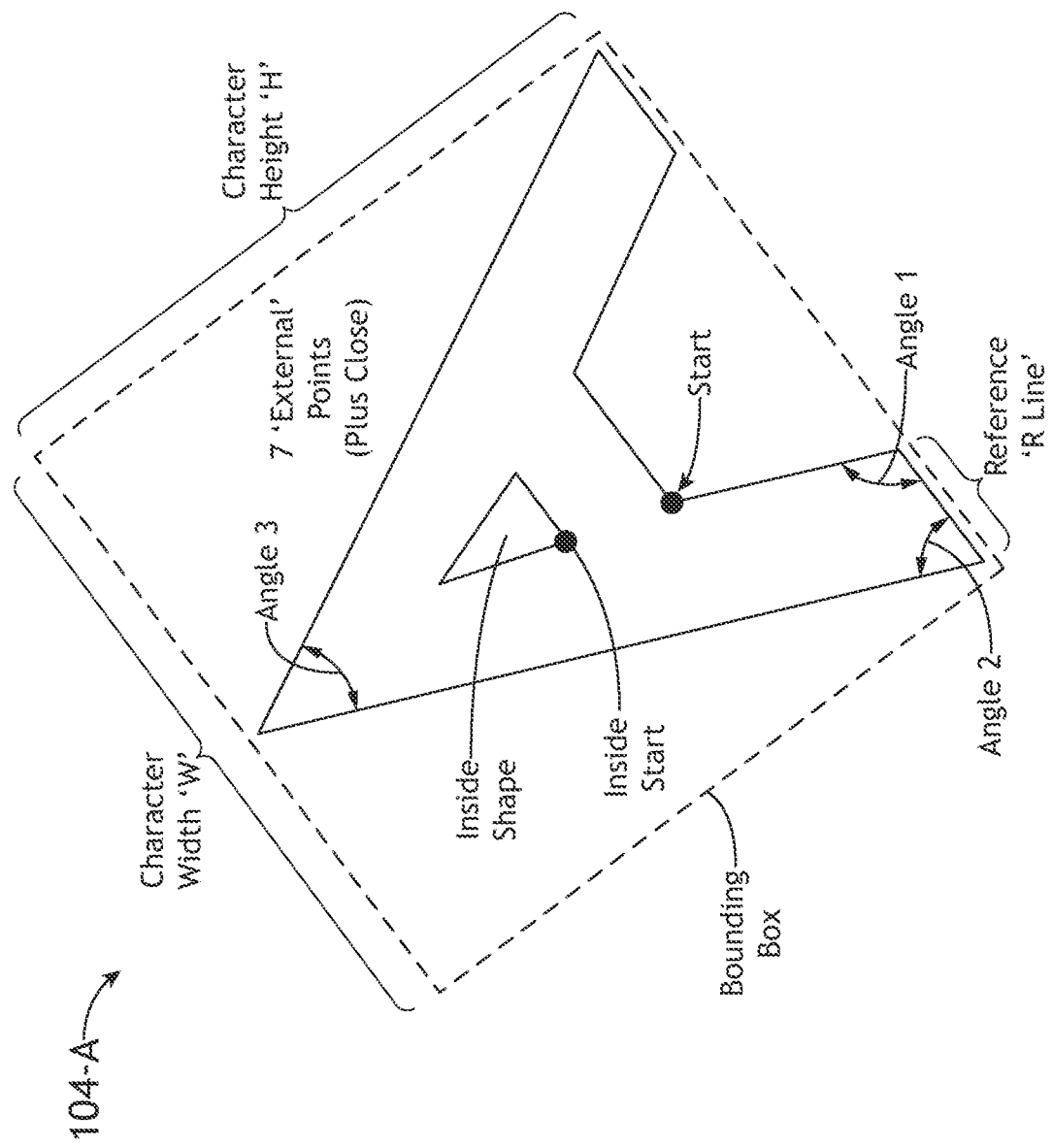
FIG. 3A is a view of exemplary embodiments of an exemplary textual character according to the inventive concepts disclosed herein.

Referring now to FIGS. 3A-4, exemplary embodiments of exemplary textual character 104A (e.g., "A" textual character) and textual character 104C (e.g., "C" textual character) of the image (e.g., the flight chart image 100) of the image file (e.g., a graphical image file) according to the inventive concepts disclosed herein is depicted.

In some embodiments, a computing device may be configured to: obtain a graphical image file (e.g., which may be in PDF format), the graphical image file including an image (e.g., a flight chart image 100), wherein the image includes at least one portion including textual characters 104, wherein each textual character 104 of the textual characters 104 is formed of line segments; and convert the graphical image file to at least one file including hardware directives that when executed cause a recreation of the image of the graphical image file to be drawn. For example, the step of converting the graphical image file to at least one file including hardware directives that when executed cause a recreation of the image of the graphical image file to be drawn may include any or all of the following: testing sections (e.g., made up of the line segments) in each path around a shape(s) of the textual character 104 to determine if the textual character 104 represents a character in a known font; loop through each known character in each known font to try to determine if the textual character 104 is a match to any known character in any known font, wherein each known character in each known font may be stored in at least one data structure (e.g., table(s)); and/or inspect the textual character 104 against pre-determined font characteristic values (e.g., of a table(s)). For example, inspecting the given textual character 104 against the predetermined font characteristic values for at least one of the following: a) a number of sections of the given textual character 104, b) a number of angles of each shape of the given textual character 104, wherein each angle of the angles is between two sections of the sections, c) for each angle or curve of the shape of the given textual character 104, at least one of an angle range (+/−a predetermined tolerance value), a curve range (+/−a predetermined tolerance value), or a total angle range (+/−a predetermined tolerance value) for consecutive angles, d) a sequence of the angles of the given textual character 104, and/or e) a ratio (+/−a predetermined tolerance value) of width to height of the given textual character 104. Further, the step of converting the graphical image file to at least one file including hardware directives that when executed cause a recreation of the image of the graphical image file to be drawn may include any or all of the following: if a match is detected, replace the line segments of the given textual character 104 with a character font reference; and/or draw the character corresponding to the character font reference while accounting for an orientation angle and appropriate sizing. The predetermined font characteristic values may be determined by analyzation of a statistically significant sample size of exemplars.

In some embodiments, chart text and characters 104 may be input to the chart tools of the computing device as filled shapes, and each character 104 may be drawn by an individual path. Some of the character shapes have hundreds of points forming the character 104. To lower the total number of points stored, characters may be converted to a predefined standard character font and stored once as a 'character subroutine', or more properly as a 'font' and accessed as a common resource for other matching characters in the flight chart image 100 or other flight chart images 100.

Fonts may be detected using values in a predetermined table(s). The pre-determined font characteristic values vary by font. Each upper and lower case character, each number, and a number of special characters have their own detection values.

Character fonts may be detected using a sequence of criteria that separate characters from other chart objects and from each other. These criteria may include: the number of vertices in a path; the sequence of angles at each vertex; the sum of a sequence of angles; whether the character has an inside shape; and/or the ratio of character width to character height.

To draw the character properly, each character has a consistently defined start location and a 'reference line' that can be used to determine the rotation angle of the character. Note that the start location is not always at the left corner of the character. The reference line is often a horizontal line when the character is drawn upright, but not always. Some characters (such as 0 and 8) do not have any straight lines. Others, such as S, have straight lines, but they are not oriented along a primary axis.

Curves within a character are broken into many small line segments which are not standard. To match a predetermined font characteristic value, the segment angles must fall within a specified range (for example, 176-183 degrees). The entire curve is considered one vertex angle. The curve is "completed" once a line segment angle falls outside of the specified range.

The tolerances should be set so that characters are detected with a high probability and nearly never (or never) incorrectly. Tolerances may be used since the group of lines representing a character is not always 'clean'.

Both tolerances and tracking total angles may be necessary for curved shapes since the component lines defining the characters are not standard, as illustrated by two unclosed sets of paths 106-1, 106-2 (e.g., for generating numbers "9") in FIG. 4.

Figure 3B:
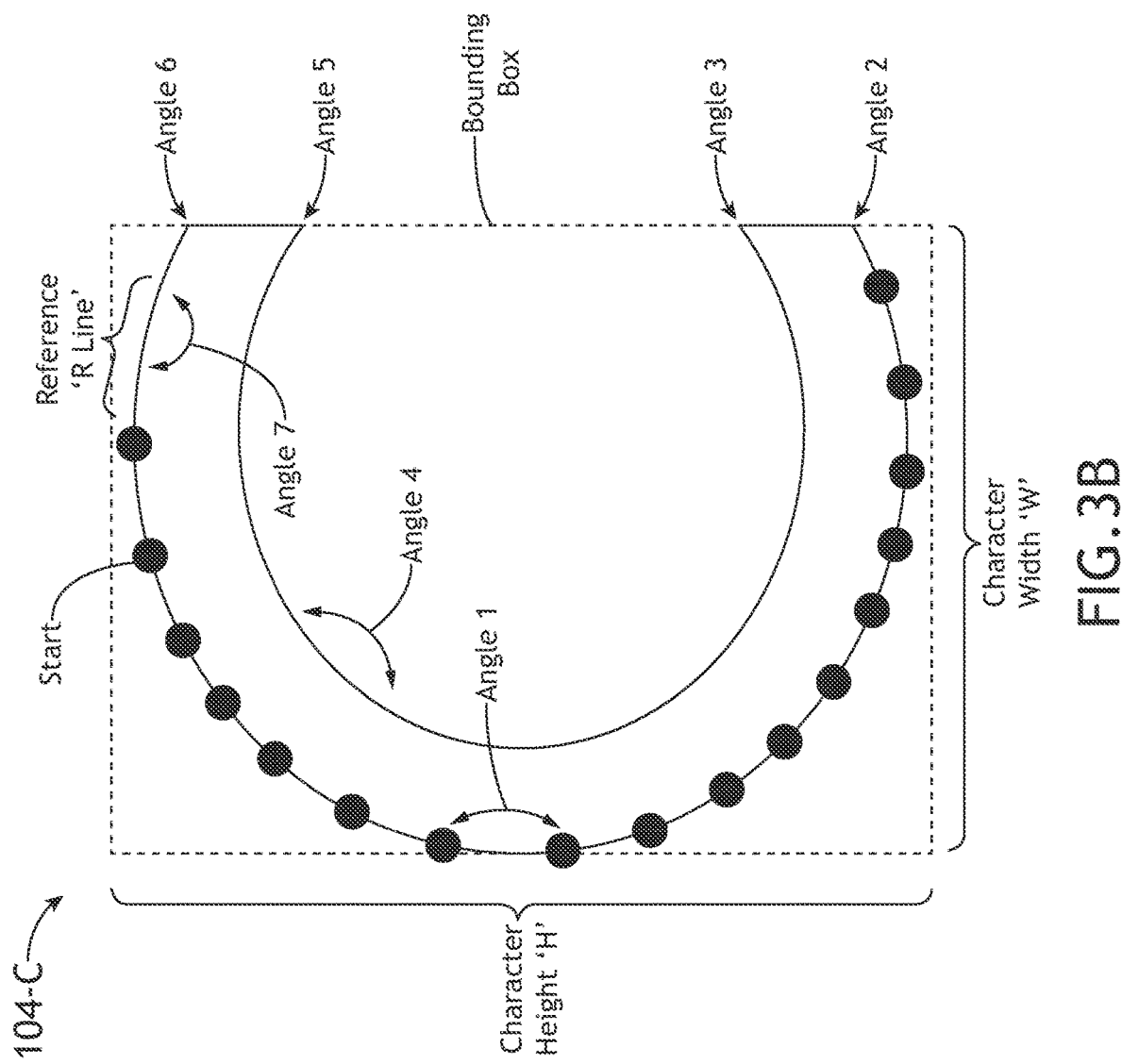
FIG. 3B is a view of exemplary embodiments of an exemplary textual character according to the inventive concepts disclosed herein.

Referring now to FIG. 3B, as shown, character "C" 104-C has three curve sections (Angles 1, 4, and 7). The first curve (Angle 1) is the starting location for this character and angle 7 completes the character. There are many points along this curve. The angle between any two points on the curve is in the range of 177-181 degrees. The curve ends when it hits Angle 2, and the straight-line segment is drawn from that vertex to the vertex of Angle 3.

Figure 5:
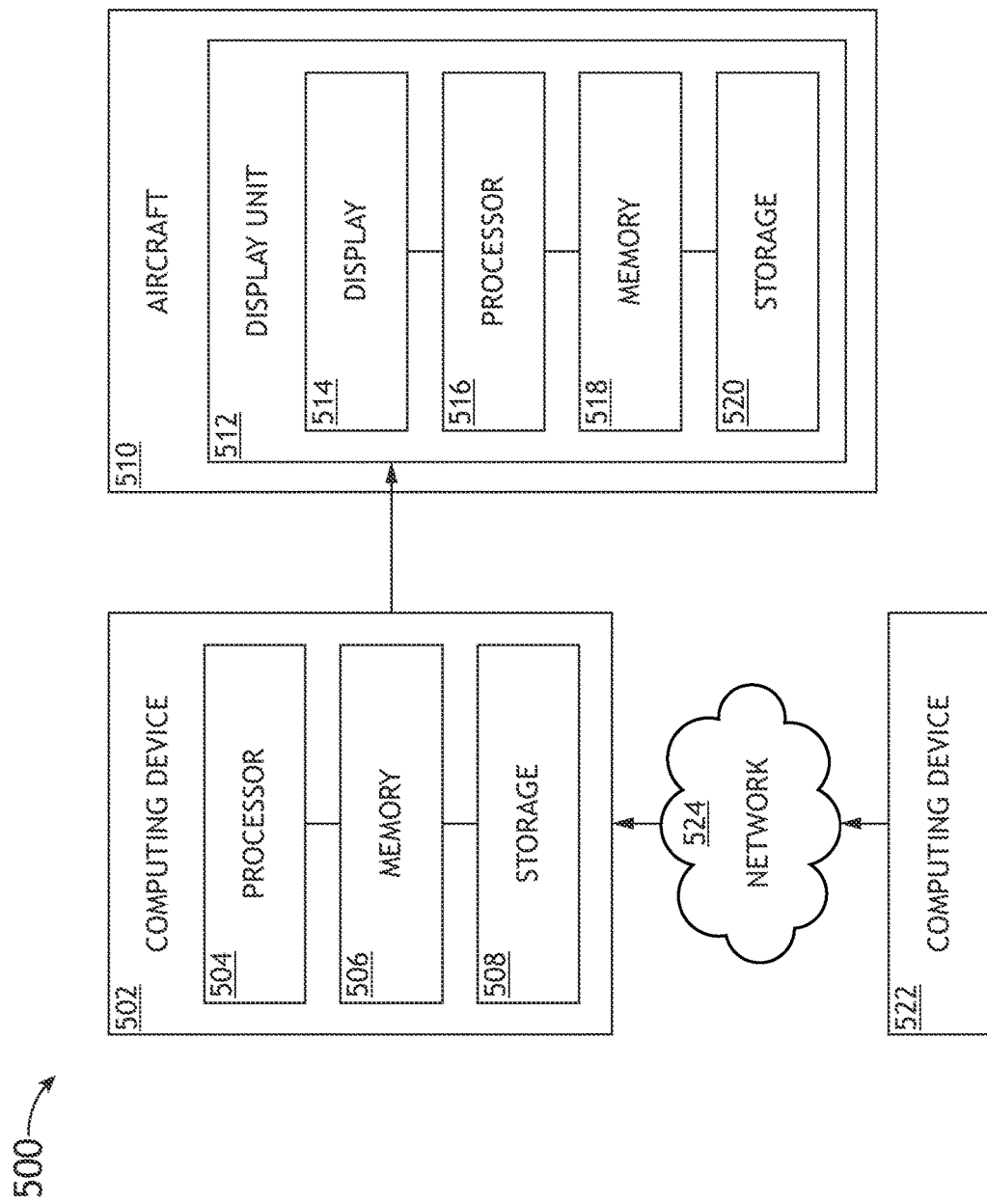
FIG. 5 is a view of an exemplary embodiment of a system according to the inventive concepts disclosed herein.

Referring now to FIG. 5, an exemplary embodiment of a system 500 according to the inventive concepts disclosed herein is depicted. In some embodiments, the system 500 may include at least one computing device 502, at least one aircraft 510, at least one computing device 522, and/or at least one network 524, some or all of which may be communicatively coupled at any given time.

For example, the computing device 502 may be configured to obtain (e.g., receive from the computing device 522) a graphical image file, the graphical image file including an image (e.g., a flight chart image 100). The image may include at least one portion 102 including textual characters 104, wherein each textual character 104 of the textual characters 104 is formed of line segments. For example, the computing device 502 may be configured to convert the graphical image file to at least one file including hardware directives that when executed cause a recreation of the image of the graphical image file to be drawn, wherein a file size of the at least one file is smaller than the graphical image file. In some embodiments, the at least one file may be output by the computing device 502 and loaded onto an avionics computing device of the aircraft 510, such as a display unit computing device 512. For example, the display unit computing device 512 may be configured to execute the hardware directives of the at least one file, which causes a recreation of the image of the graphical image file to be drawn on a display 514 of the display unit computing device 512.

The at least one computing device 502 may be implemented as any suitable computing device, such as a host computing device located offboard of the aircraft 510 and/or located remotely from the aircraft 510. The at least one computing device 502 may include any or all of the elements, as shown in FIG. 5. For example, the computing device 502 may include at least one processor 504, at least one memory 506, and/or at least one storage 508, some or all of which may be communicatively coupled at any given time. For example, the at least one processor 504 may include at least one central processing unit (CPU), at least one graphics processing unit (GPU), at least one field-programmable gate array (FPGA), at least one application specific integrated circuit (ASIC), at least one digital signal processor, at least one image processor, at least one virtual machine (VM) running on at least one processor, and/or the like configured to perform (e.g., collectively perform) any of the operations disclosed throughout. For example, the at least one processor 504 may include a CPU and a GPU configured to perform (e.g., collectively perform) any of the operations disclosed throughout. The processor 504 may be configured to run various software applications or computer code stored (e.g., maintained) in a non-transitory computer-readable medium (e.g., memory 506 and/or storage 508) and configured to execute various instructions or operations. The processor 504 of the computing device 502 may be configured to perform any or all of the operations disclosed throughout. For example, the processor 504 of the computing device 502 may be configured to: obtain a graphical image file (e.g., a graphical flight chart image file), the graphical image file including an image (e.g., a flight chart image 100), wherein the image includes at least one portion 102 including textual characters 104, wherein each textual character 104 of the textual characters 104 is formed of line segments; and/or convert the graphical image file to at least one file including hardware directives that when executed cause a recreation of the image of the graphical image file to be drawn, wherein a file size of the at least one file is smaller than the graphical image file.

In some embodiments, wherein the line segments of each textual character of the graphical image file are connected line segments that define a filled area, wherein at least some of the textual characters of the graphical image file are converted to character hardware directives, wherein execution of each of the character hardware directives causes at least one of a vectorized version of a textual character or a filled-triangles version of the textual character to be drawn in the recreation of the image (e.g., the flight chart image 100). For example, whether each of the character hardware directives causes a vectorized version of a textual character and/or a filled-triangles version of the textual character to be drawn may depend on any of several factors, such as a maximum required size of the character when at maximum zoom, or the like.

In some embodiments, the graphical image file may be any suitable type of graphical image file that has at least one portion 102 including the textual characters 104. For example, the graphical image file may be a portable digital file (PDF), a Joint Photographic Experts Group (JPEG) file, a Portable Network Graphics (PNG) file, a graphics interchange format (GIF) file, a tagged image file (TIFF), a Photoshop document (PSD), an encapsulated postscript (EPS) file, an Adobe Illustrator (AI) document, an Adobe Indesign Document (INDD), or a raw image format.

In some embodiments, at least one data structure (e.g., table(s) 600A, 600B) may be maintained in the at least one computer readable medium, wherein the at least one data structure contains predetermined font characteristic values for predetermined characters of multiple predetermined fonts. In some embodiments, the at least one processor 504 being configured to convert the graphical image file to the at least one file comprises the at least one processor 504 being configured to: for a given textual character 104 of the at least one portion 102 including the textual characters 104, inspect the given textual character 104 against the predetermined font characteristic values for at least one of the following: a) a number of sections of the given textual character 104, b) a number of angles of each shape of the given textual character 104, wherein each angle of the angles is between two sections of the sections, c) for each angle or curve of the shape of the given textual character 104, at least one of an angle range, a curve range, or a total angle range for consecutive angles, d) a sequence of the angles of the given textual character 104, and/or e) a ratio of width to height of the given textual character 104; for the given textual character 104, determine that the given textual character 104 matches a given character of a given font based at least on the given textual character 104 matching all inspected font characteristic values of the predetermined font characteristic values for the given character of the given font; upon determining that the given textual character 104 matches the given character of the given font, store at least one character hardware directive that when executed causes at least one of a vectorized version or a filled-triangles version of the given textual character 104 to be drawn. In some embodiments, a size of the at least one character hardware directive is at least 75% (e.g., at least 99%) smaller than a size of the given textual character 104 of the graphical image file. In some embodiments, at least one of the hardware directives includes scaling and rotational characteristics necessary for drawing the at least one of the vectorized version or the filled-triangles version of the given textual character 104 to match a scale and angular orientation of the given textual character 104 in the image (e.g., the flight chart image 100) of the graphical image file.

In some embodiments, the at least one processor 504 being configured to convert the graphical image file to the at least one file comprises the at least one processor 504 being configured to: for a second given textual character 104 of the at least one portion 102 including the textual characters 104, inspect the second given textual character 104 against the predetermined font characteristic values for at least one of the following: a) a number of sections of the second given textual character 104, b) a number of angles of each shape of the second given textual character 104, c) for each angle or curve of the shape of the second given textual character 104, at least one of an angle range, a curve range, or a total angle range for consecutive angles, d) a sequence of the angles of the second given textual character 104, and/or e) a ratio of width to height of the second given textual character 104; for the second given textual character 104, determine that the second given textual character 104 matches the given character of the given font based at least on the second given textual character 104 matching all inspected font characteristic values of the predetermined font characteristic values for the given character of the given font; and/or upon determining that the second given textual character 104 matches the given character of the given font, store at least one call to execute the at least one character hardware directive that when executed causes the at least one of the vectorized version or the filled-triangles version of the given textual character to be drawn. In some embodiments, a size of the at least one call is at least 75% (e.g., at least 99%) smaller than a size of the second given textual character 104 of the graphical image file.

In some embodiments, the image of the graphical image file is a flight chart image 100, and when the hardware directives are executed by a display unit computing device 512 of an aircraft 510, the recreation of the flight chart image 100 of the graphical image file is drawn on a display 514 of the display unit computing device 512.

In some embodiments, the at least one processor 504 being configured to convert the graphical image file to the at least one file comprises the at least one processor 504 being configured to: for a second given textual character 104 of the at least one portion 102 including the textual characters 104, inspect the second given textual character 104 against the predetermined font characteristic values for the following: a) the number of sections of the second given textual character 104, b) the number of the angles of each shape of the second given textual character 104, c) for each angle or curve of the shape of the second given textual character 104, the at least one of the angle range, the curve range, or the total angle range for the consecutive angles, d) the sequence of the angles of the second given textual character 104, and/or e) the ratio of the width to the height of the second given textual character 104; for the second given textual character 104, determine that the second given textual character 104 fails to match any character of any font based at least on the second given textual character 104 failing to match all inspected font characteristic values of the predetermined font characteristic values for any character of any font; and/or upon determining that the second given textual character 104 fails to match any character of any font based at least on the second given textual character failing to match all inspected font characteristic values of the predetermined font characteristic values for any character of any font, store at least one second character hardware directive that when executed causes a copied version of the second given textual character 104 to be drawn, the copied version of the second given textual character 104 being copied from the graphical image file.

In some embodiments, the aircraft 510 may include at least one user (e.g., flight crew and/or pilot(s)) (not shown), at least one display unit computing device 512, at least one aircraft computing device (not shown), and/or at least one user interface (not shown), some or all of which may be communicatively coupled at any given time.

The display unit computing device 512 may be implemented as any suitable computing device, such as a primary flight display (PFD) computing device and/or a multi-function window (MFW) display computing device. As shown in FIG. 5, the display unit computing device 512 may include at least one display 514, at least one processor 516, at least one memory 518, and/or at least one storage 520, some or all of which may be communicatively coupled at any given time. For example, the at least one processor 516 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 516 may include a CPU and a GPU configured to perform (e.g., collectively perform) any of the operations disclosed throughout. The processor 516 may be configured to run various software applications (e.g., a PFD application, and/or an MFW application) and/or computer code stored (e.g., maintained) in a non-transitory computer-readable medium (e.g., memory 518 and/or storage 520) and configured to execute various instructions or operations. The processor 516 may be configured to perform any or all of the operations disclosed throughout. For example, the processor 516 may be configured to: obtain the at least one file (e.g., from the computing device 502); and/or execute the hardware directives of the at least one file, which causes a recreation of the image of the graphical image file to be drawn on a display 514 of the display unit computing device 512. The display 514 may be configured to display the recreation of the image (e.g., a flight chart image 100) of the graphical image file.

In some embodiments, the at least one display unit computing device 104 for the aircraft 510 may be located offboard of the aircraft 102, for example, if a given aircraft 102 is a remotely piloted and/or managed aircraft (e.g., an unmanned aerial vehicle (UAV) or a drone aircraft).

In some embodiments, the computing device 522 may be any suitable computing device. The computing device 522 may have similar elements and functionality as the computing device 502, except that the computing device 522 may be configured to provide (e.g., via the network 524) the graphical image file to the computing device 502. In some embodiments, the computing device 522 may be operated by a third-party vendor of the graphical image file.

In some embodiments, the at least one display unit computing device 512, the computing device 502, and/or the computing device 522 may be implemented as a single computing device or any number of computing devices configured to perform (e.g., collectively perform if more than one computing device) any or all of the operations disclosed throughout.

At least one processor (e.g., the at least one processor 504 and/or the at least one processor 516) may be configured to perform (e.g., collectively perform) any or all of the operations disclosed throughout.

Referring now to FIGS. 6A-6B, exemplary embodiments of data structures (e.g., tables 600A, 600B) containing predetermined font characteristic values for predetermined characters of a given font according to the inventive concepts disclosed herein are depicted.

The tables 600A, 600B may contain predetermined font characteristic values that define the character recognition parameters for each font. "Path Angle Ranges" are defined in the order each vertex angle is expected to occur within a character path definition. Some characters contain multiple shapes, so each path angle range list starts with the shape number ("1:", "2:", etc.). Curves are described using many small line segments, each vertex angle within the curve must fall with the specified angle range. The curve is "completed" once a vertex angle falls outside the specified range. The sum of the angles for consecutive vertices can also be used, this is specified using the format "Total:x,y-z", where "x" is the number of vertices to sum, and "y-z" is the total angle range.

The tables 600A, 600B contain the base character definitions for each font. The reference angle is calculated using two points within the base character path. Points are 0 based (0 is the first point in a path), and unless noted otherwise, belong to the first shape in the base character path. If the reference angle point begins with "x:", then "x" is the 1 based shape number. Some reference angle points are also specified using "First", "First+1", "Last", etc., and refer to logical points within the first shape of the base character path.

The predetermined font characteristic values are obtained by analyzing exemplar character fonts through the analysis of short lines. Those lines meet at angles that can be pre-determined and placed in these tables.

Referring now to FIGS. 3A and 6A, for an "A", using the first table 600A, an angle between 293 and 296 degrees, followed by an angle between 244 and 247, etc. (as shown in the table 600A) starts to define an A. An A is also defined by having two closed areas, the outer boundary, and the inner boundary (inside shape) that has two defined angles (the 2[Range:64-66, Range: 64-66]). Angles are relative to the previous line rather than absolute angles. The last angle is usually a 'close shape' so no angle is given and so no determination needs to be made as to whether it matches.

Referring now to FIG. 6B, the second table 600B gives other relevant information, including a ratio between the height and the width, what points indicate the reference line, and what the angle of the reference line is.

Referring again to FIGS. 6A and 6B, for a character 104 to be recognized, a character recognition analysis steps through a set of given lines, matching angles, and ensuring that the ratio between height and width is correct. For 'curves', as defined in the table, any number of connected lines may be analyzed, as long as they are within the given angle range. If the set of lines varies from the data in the table, a match is not found.

If a character 104 is recognized, the character 104 may now be reduced to a function call that draws a pre-defined image of standard character of a given font. The character 104 will be drawn at an angle defined by the difference between the reference angle and the actual line angle. The height and width will be scaled based on the height and width ratios as compared to the pre-defined image ratios. The individual lines that were input may then be discarded.

To lower the total number of points stored, characters 104 are stored once as function calls or 'character subroutines', or more properly as 'fonts' and accessed as a common resource. Having detected a character (e.g., C, as shown in FIG. 3B), we can store the character 104. A character 104 may have many points, especially one that is curvy. When another character 104 of that type is found (e.g., another C), the many points that define the character 104 do not have to be saved. Instead, a single 'call subroutine' can be placed in the display data stream. This call points to the stored image (the many points that make up the character 104).

The start location may be determined by analysis of the input data. The ratios, angles and variance are also determined by analysis. This control data should be loose enough to ensure we find a high percentage of characters, but tight enough to ensure we never or almost never make an incorrect character assignment.

The reference line is also determined by analysis. For an "8", for instance, it was noted that the first point in the second shape and the first point in the third shape defined a constant angle that could be used as a reference (the second and third shapes in the input data define the two inner circles that make up the character '8'.)

Referring now to FIGS. 3B and 6A-6B, for a "C", an exemplary character recognition analysis is described below. (It should be noted that the "C" character 104-C in FIG. 3B is referenced as an example of a "C", as the "C" character 104-C in FIG. 3B is a different font than that of tables 600A, 600B.)

The dots of the "C" character 104-C in FIG. 3B represent points that are received in the input data. Those points are close together and, when connected, give the 'C' its curvy shape.

The start of this 'C' definition would define a 'Curve' with angle and tolerance 1. Each of the points would be traversed until they failed to match the angle within the tolerance. The check would fail at range angle 2.

If range angle 2 passed, range angle 3 would be checked.

If range angle 3 passed, curve angle 4 would be checked until it failed. It would fail at angle 5.

If range angles 5 and 6 passed, curve angle 7 would be checked until a 'close command' was found (the input data defines a close command, which connects the last stylus position with the start position).

In this example for the "C" character 104-C in FIG. 3B, the reference angle would be the last angle drawn (the line defined by the close command connecting the last small line around the curve). In the actual table 600A, the start point would be one of the right-side flat edges, and the reference line is that flat edge.

The height and width of the character, given by the farthest points (top, bottom, left, right) are also checked to ensure that the character size ratio is correct. For example, this is done to prevent a building 702A, which matches all the given angles, from being converted to an "L" 702B, as shown in FIG. 7.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include obtaining, by at least one processor communicatively coupled to at least one computer readable medium, a graphical image file, the graphical image file including an image, wherein the image includes at least one portion including textual characters, wherein each textual character of the textual characters is formed of line segments.

A step 804 may include converting, by the at least one processor, the graphical image file to at least one file including hardware directives that when executed cause a recreation of the image of the graphical image file to be drawn, wherein a size of the at least one file is smaller than the graphical image file.

Further, the method 800 may include any of the operations disclosed throughout.

As will be appreciated from the above, embodiments of the inventive concepts disclosed herein may be directed to a system and a method configured to recreate an image of a graphical image file to reduce storage space, the image having textual characters.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one computer readable medium; and
at least one processor communicatively coupled to the at least one computer readable medium, the at least one processor configured to:
obtain a graphical image file, the graphical image file including an image, wherein the image includes at least one portion including textual characters, wherein each textual character of the textual characters is formed of line segments; and
convert the graphical image file to at least one file including hardware directives that when executed cause a recreation of the image of the graphical image file to be drawn,
wherein a size of the at least one file is smaller than the graphical image file,
wherein the line segments of each textual character of the graphical image file are connected line segments that define a filled area, wherein at least some of the textual characters of the graphical image file are converted to character hardware directives, wherein execution of each of the character hardware directives causes at least one of a vectorized version of a textual character or a filled-triangles version of the textual character to be drawn in the recreation of the image,
wherein at least one data structure is maintained in the at least one computer readable medium, wherein the at least one data structure contains predetermined font characteristic values for predetermined characters of multiple predetermined fonts,
wherein the at least one processor being configured to convert the graphical image file to the at least one file comprises the at least one processor being configured to:
for a given textual character of the textual characters, inspect the given textual character against the predetermined font characteristic values for at least one of the following: a) a number of sections of the given textual character, b) a number of angles of each shape of the given textual character, wherein each angle of the angles is between two sections of the sections, c) for each angle or curve of the shape of the given textual character, at least one of an angle range, a curve range, or a total angle range for consecutive angles, d) a sequence of the angles of the given textual character, or e) a ratio of width to height of the given textual character;
for the given textual character, determine that the given textual character matches a given character of a given font based at least on the given textual character matching all inspected font characteristic values of the predetermined font characteristic values for the given character of the given font; and
upon determining that the given textual character matches the given character of the given font, store at least one character hardware directive that when executed causes at least one of a vectorized version or a filled-triangles version of the given textual character to be drawn;
wherein the at least one processor is further configured to:
for a second given textual character of the textual characters, inspect the second given textual character against the predetermined font characteristic values for the following: a) the number of sections of the second given textual character, b) the number of the angles of each shape of the second given textual character, c) for each angle or curve of the shape of the second given textual character, the at least one of the angle range, the curve range, or the total angle range for the consecutive angles, d) the sequence of the angles of the second given textual character, and e) the ratio of the width to the height of the second given textual character;
for the second given textual character, determine that the second given textual character fails to match any character of any font based at least on the second given textual character failing to match all inspected font characteristic values of the predetermined font characteristic values for any character of any font; and
upon determining that the second given textual character fails to match any character of any font based at least on the second given textual character failing to match all inspected font characteristic values of the predetermined font characteristic values for any character of any font, store at least one second character hardware directive that when executed causes a copied version of the second given textual character to be drawn, the copied version of the second given textual character being copied from the graphical image file.

2. The system of claim 1, wherein the graphical image file is a portable digital file (PDF).

3. The system of claim 1, wherein a size of the at least one character hardware directive is at least 75% smaller than a size of the given textual character of the graphical image file.

4. The system of claim 1, wherein the at least one processor being configured to convert the graphical image file to the at least one file further comprises the at least one processor being configured to:
for a second given textual character of the textual characters, inspect the second given textual character against the predetermined font characteristic values for at least one of the following: a) a number of sections of the second given textual character, b) a number of angles of each shape of the second given textual character, c) for each angle or curve of the shape of the second given textual character, at least one of an angle range, a curve range, or a total angle range for consecutive angles, d) a sequence of the angles of the second given textual character, or e) a ratio of width to height of the second given textual character;
for the second given textual character, determine that the second given textual character matches the given character of the given font based at least on the second given textual character matching all inspected font characteristic values of the predetermined font characteristic values for the given character of the given font; and
upon determining that the second given textual character matches the given character of the given font, store at least one call to execute the at least one character hardware directive that when executed causes the at least one of the vectorized version or the filled-triangles version of the given textual character to be drawn.

5. The system of claim 4, wherein a size of the at least one call is at least 99% smaller than a size of the second given textual character of the graphical image file.

6. The system of claim 1, wherein the at least one processor being configured to for the given textual character of the at least one portion including the textual characters, inspect the given textual character against the predetermined font characteristic values for the at least one of the following: a) the number of sections of the given textual character, wherein each angle of the angles is between the two sections of the sections b) the number of the angles of each shape of the given textual character, c) for each angle or curve of the shape of the given textual character, the at least one of the angle range, the curve range, or the total angle range for the consecutive angles, d) the sequence of the angles, or e) the ratio of the width to the height of the given textual character comprises the at least one processor being configured to:
for the given textual character of the textual characters, inspect the given textual character against the predetermined font characteristic values for the following: a) the number of sections of the given textual character, b) the number of the angles of each shape of the given textual character, c) for each angle or curve of the shape of the given textual character, the at least one of the angle range or the curve range or the total angle range for the consecutive angles, d) the sequence of the angles of the given textual character, and e) the ratio of the width to the height of the given textual character.

7. The system of claim 1, wherein at least one of the hardware directives includes scaling and rotational characteristics necessary for drawing the at least one of the vectorized version or the filled-triangles version of the given textual character to match a scale and angular orientation of the given textual character in the image of the graphical image file.

8. The system of claim 1, wherein the image of the graphical image file is a flight chart image, wherein when the hardware directives are executed by a display unit computing device of an aircraft, the recreation of the flight chart image of the graphical image file is drawn on a display of the display unit computing device.

9. The system of claim 8, wherein at least one of the hardware directives includes scaling and rotational characteristics necessary for drawing the at least one of the vectorized version or the filled-triangles version of the given textual character to match a scale and angular orientation of the given textual character in the image of the graphical image file.

10. The system of claim 1, wherein the image of the graphical image file is a flight chart image, wherein when the hardware directives are executed by a display unit computing device of an aircraft, wherein the recreation of the flight chart image of the graphical image is drawn on a display of the display unit computing device.

11. The system of claim 10, further comprising a computing device comprising the at least one computer readable medium and the at least one processor, wherein the computing device is located remotely from the aircraft.

12. A method, comprising:
obtaining, by at least one processor communicatively coupled to at least one computer readable medium, a graphical image file, the graphical image file including an image, wherein the image includes at least one portion including textual characters, wherein each textual character of the textual characters is formed of line segments; and
converting, by the at least one processor, the graphical image file to at least one file including hardware directives that when executed cause a recreation of the image of the graphical image file to be drawn,
wherein a size of the at least one file is smaller than the graphical image file,
wherein the line segments of each textual character of the graphical image file are connected line segments that define a filled area, wherein at least some of the textual characters of the graphical image file are converted to character hardware directives, wherein execution of each of the character hardware directives causes at least one of a vectorized version of a textual character or a filled-triangles version of the textual character to be drawn in the recreation of the image,
wherein at least one data structure is maintained in the at least one computer readable medium, wherein the at least one data structure contains predetermined font characteristic values for predetermined characters of multiple predetermined fonts,
wherein the converting, by the at least one processor, the graphical image file to at least one file comprises:
for a given textual character of the textual characters, inspecting, by the at least one processor, the given textual character against the predetermined font characteristic values for at least one of the following: a) a number of sections of the given textual character, b) a number of angles of each shape of the given textual character, wherein each angle of the angles is between two sections of the sections, c) for each angle or curve of the shape of the given textual character, at least one of an angle range, a curve range, or a total angle range for consecutive angles, d) a sequence of the angles of the given textual character, or e) a ratio of width to height of the given textual character;
for the given textual character, determining, by the at least one processor, that the given textual character matches a given character of a given font based at least on the given textual character matching all inspected font characteristic values of the predetermined font characteristic values for the given character of the given font; and
upon determining that the given textual character matches the given character of the given font, storing, by the at least one processor, at least one character hardware directive that when executed causes at least one of a vectorized version or a filled-triangles version of the given textual character to be drawn;
wherein the method further comprises:
for a second given textual character of the textual characters, inspecting, by the at least one processor, the second given textual character against the predetermined font characteristic values for the following: a) the number of sections of the second given textual character, b) the number of the angles of each shape of the second given textual character, c) for each angle or curve of the shape of the second given textual character, the at least one of the angle range, the curve range, or the total angle range for the consecutive angles, d) the sequence of the angles of the second given textual character, and e) the ratio of the width to the height of the second given textual character;

for the second given textual character, determining, by the at least one processor, that the second given textual character fails to match any character of any font based at least on the second given textual character failing to match all inspected font characteristic values of the predetermined font characteristic values for any character of any font; and upon determining that the second given textual character fails to match any character of any font based at least on the second given textual character failing to match all inspected font characteristic values of the predetermined font characteristic values for any character of any font, storing, by the at least one processor, at least one second character hardware directive that when executed causes a copied version of the second given textual character to be drawn, the copied version of the second given textual character being copied from the graphical image file.

* * * * *